United States Patent [19]
Gallagher

[11] Patent Number: 5,483,039
[45] Date of Patent: Jan. 9, 1996

[54] CYCLICALLY CONTROLLED WELDING PURGE CHAMBER

[75] Inventor: Robert L. Gallagher, Slidell, La.

[73] Assignee: Martin Marietta Corp., Bethesda, Md.

[21] Appl. No.: 381,601

[22] Filed: Jan. 19, 1995

[51] Int. Cl.⁶ ..................................... B23K 9/16
[52] U.S. Cl. .................. 219/125.11; 219/74; 219/159; 228/219
[58] Field of Search .................... 219/74, 125.11, 219/159, 160; 228/219

[56] References Cited

U.S. PATENT DOCUMENTS

| | | | |
|---|---|---|---|
| 2,922,870 | 1/1960 | Collins et al. | 219/74 |
| 3,080,843 | 3/1963 | Abbot et al. | 219/125.11 |
| 4,081,651 | 3/1978 | Randolph et al. | 219/61 |
| 4,892,993 | 1/1990 | Stol | 219/125.1 |
| 5,231,258 | 7/1993 | Hunt | 219/74 |
| 5,290,989 | 3/1994 | Zibilich et al. | 219/74 |
| 5,388,753 | 2/1995 | Bjorkman, Jr. | 228/42 |

Primary Examiner—Clifford C. Shaw
Attorney, Agent, or Firm—W. H. Meise; S. A. Young; G. Chin

[57] ABSTRACT

An arrangement for butt-welding cylindrical sections of large, thin-wall tanks includes a rotatable mandrel with side-by-side sets of radial position adjusters. Each set of adjusters bears on one of the tank sections adjacent the seam, to prevent the sections from sagging out-of-round. The mandrel rotates relative to the welder, so that a continuous seam is formed. A purge chamber is fixed in position behind the seam at the weld head, and is flushed with inert gas. The purge chamber includes a two-sided structure which is contiguous with the cylindrical sections and a circumferential vane to form an open-ended tube-like structure, through which the radial position adjusters pass as the mandrel and cylindrical workpiece sections rotate. The tube-like structure is formed into a chamber by a plurality of movable gates which are controlled to maintain a seal while allowing adjusters to progress through the purge chamber.

10 Claims, 16 Drawing Sheets

12,483,039

CYCLICALLY CONTROLLED WELDING PURGE CHAMBER

The invention described herein was made in the performance of work under NASA Contract No. NAS 8-36200, and is subject to the provisions of Section 305 of the National Aeronautics and Space Act of 1958, as amended (42 U.S.C. 2457).

FIELD OF THE INVENTION

This invention relates to welding, and more particularly to arrangements for providing an inert gas adjacent the material being welded, where the material being welded is supported at locations along the length of the seam.

BACKGROUND OF THE INVENTION

The Space Shuttle external fuel tank is a tank 27½ feet in diameter, 153 feet long, made from 0.080 inch thick lithium-aluminum alloy. These tanks are made by welding together several cylindrical sections, together with hemispherical end sections. Welding of the seams between sections is rendered difficult by the need to align the edges being welded to within 0.003 inch during the welding operation, and because of the need for essentially perfect, nonporous, void- and contaminant-free welds.

In order to position the sections of the tank preparatory for welding, the various tank sections are mounted on an internal mandrel having a horizontal axis. The mandrel is rotatable about its axis, so that the tank sections can be rotated to present all portions of one of the circumferential butt joints to a welder. The thin material of the tank sections would sag to a noncircular form, and cause mismatch and peaking between the surfaces, if it were not supported. Support is provided to the edges of each of the adjacent sections being welded by mutually adjacent portions of the mandrel. The portion of the mandrel adjacent to, and in actual contact with the tank section, is made up of a plurality of radially extending screws. These screws allow the "shape" of the mandrel to be adjusted slightly before welding, so that the tank sections are circular to within the desired tolerance, and so that the abutting edges which are to be welded are within the desired 0.003 inch radial tolerance. When the welding is finished, the internal mandrel is disassembled and removed through an access port.

The aluminum-lithium alloy from which the tank is made tends to oxidize at the temperatures necessary for welding. This oxidation is disadvantageous, in that it can result in porosity, voids, inclusions, or other defects in the welded seam. Improved welding is desired.

SUMMARY OF THE INVENTION

A welding arrangement, for welding the edge of a sheet of thin material to a second sheet of material which it abuts, includes a welder located on one side of the sheets of material to be welded. On the other side of the sheet, a support arrangement holds the edge of the sheet of thin material in a desired configuration. In a preferred embodiment of the invention, the configuration is circular. The support arrangement includes a support, with adjusters extending from the support to locations near the edge of the sheet of thin material to be welded. In the preferred embodiment of the invention, the adjusters are radially adjustable screws. In that embodiment, the sheet of thin material is a cylindrical sheet, the edge of which is to be welded to the second sheet. In order to improve the quality of the weld, the side of the sheet of thin material opposite to the side with the welder is associated with a chamber, which is purged with a gas (a purge chamber), preferably an inert gas, so that the reverse side of the seam being welded is bathed in the inert gas, thereby tending to improve the quality of the weld. The chamber is controlled to maintain a seal notwithstanding the presence of the adjusters, which move through the chamber during the welding procedure. The controllable chamber is defined, in part, by a fixed vane or side plate projecting perpendicular to the second sheet, and parallel to the edge of the sheet of thin material which is to be welded. A rear wall of the controllable chamber, extending roughly parallel to the sheet of thin material, and on the opposite side of the sheet of thin material to be welded from the welder, is fixed in position relative to the welder, so that the chamber is always maintaining the inert gas adjacent that portion of the butt joint being welded. The rear wall has an edge extending along, or contiguous with the vane (where "contiguous" means either (a) in actual contact with the vane, or (b) close to the vane, but not in actual contact with the vane), so as to form a seal tending to retain gas in the chamber. A slotted wall extends roughly parallel to a portion of the vane, but spaced therefrom, and in intimate, gas-tight contact with the rear wall, and extending to, and being contiguous with, the sheet of thin material. The vane, the rear wall, the slotted wall, and the combined sheets of thin material and second material, together form four walls of the controllable chamber. At least three gates or tongues are controlled to extend or project through the slots in the slotted walls. In a preferred embodiment of the invention, four gates are used. When projecting through the slots, the gates extend far enough to be contiguous with the vane. The gates are controlled so that two of the gates are always in the inserted position, while at least one gate may be in a retracted position, so that a closed chamber is defined between the abovementioned four walls and the two inserted gates. The closed purge chamber is located on the reverse side of the sheet of thin material from the welder, and in line therewith. As the edge of the sheet of thin material moves relative to the welder and to the controllable chamber, the gates are controllably retracted and extended so as to clear the adjustment devices, allowing the adjustment devices to pass through the chamber, without allowing excessive amounts of ambient air to dilute the inert gas. As each adjustment device approaches the controllable chamber, the nearest inserted gate retracts to clear the adjustment device to allow it to pass and to enter the chamber, and the gate is reinserted into its slot when the adjustment device passes that slot's position. In a particular embodiment of the invention, the gate control is based upon proximity sensors.

DESCRIPTION OF THE INVENTION

Figure 1:
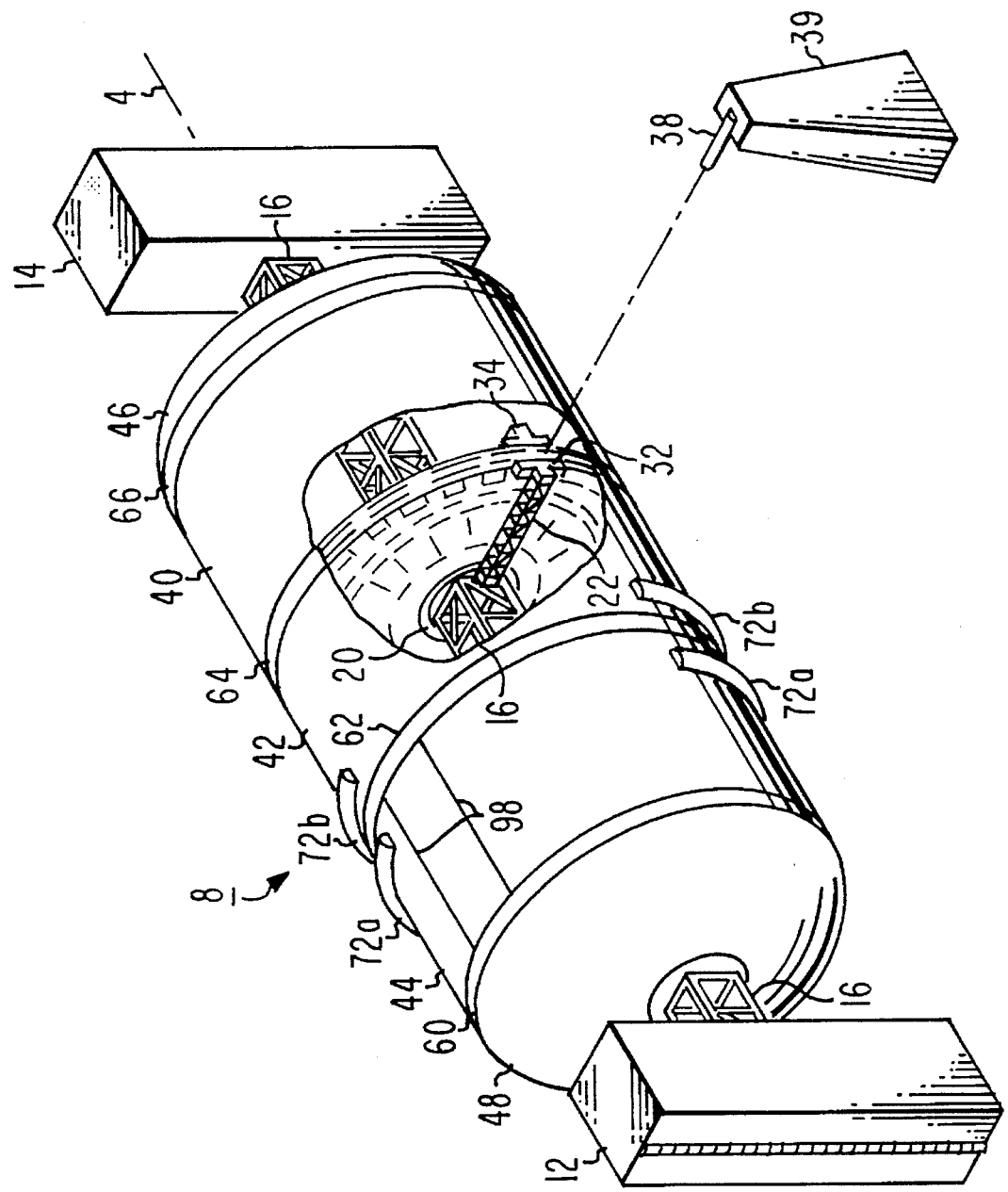
FIG. 1 is a simplified perspective or isometric view of the overall workpiece, support, controllable chamber and welder in accordance with the invention.
Figure 2:
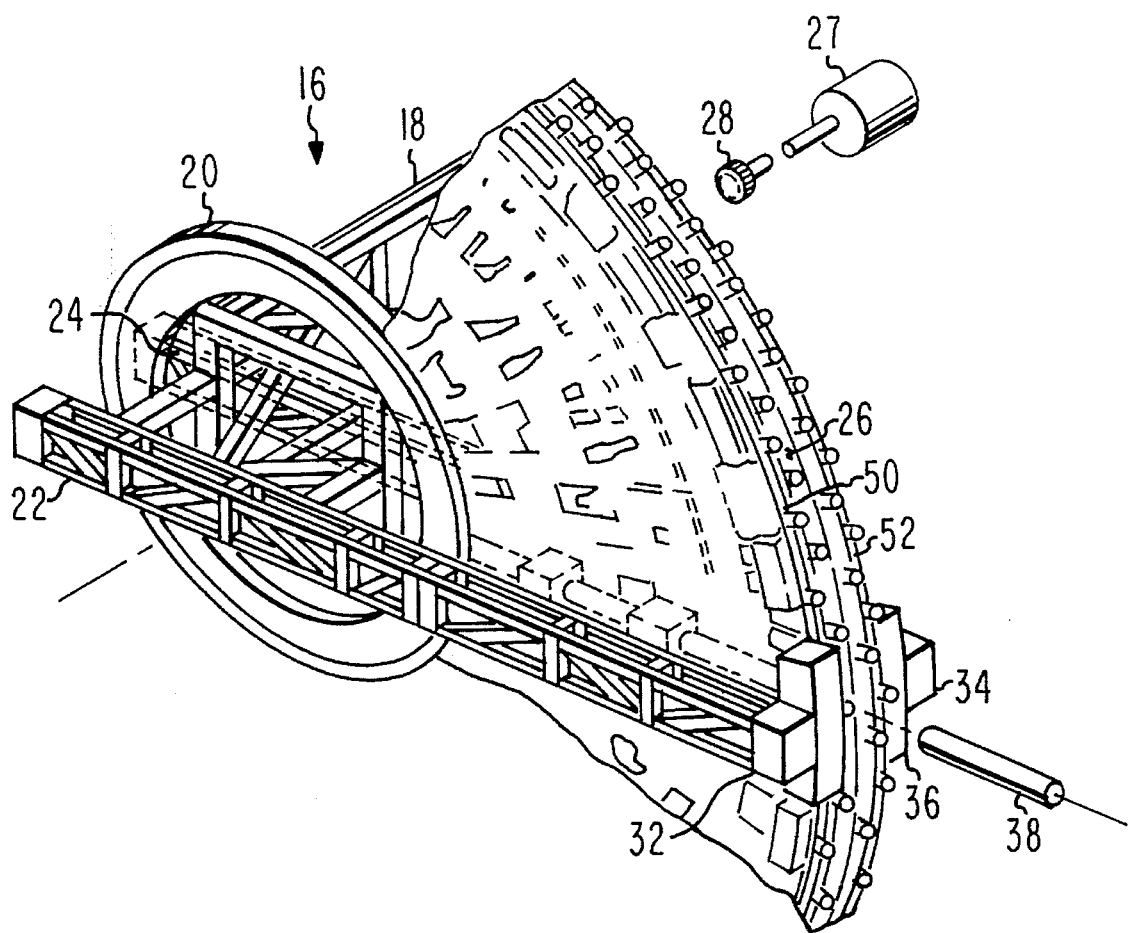
FIG. 2 is a detail of the support arrangement of FIG. 1, without the workpiece.

FIG. 1 is a perspective or isometric view of workpiece, with the workpiece 8 partially cut away to reveal a portion of the support arrangement for the workpiece. In FIG. 1, the weld head 38 and its support 39 are illustrated as being at a distance from the workpiece. FIG. 2 is a more detailed view of the support arrangement within the workpiece. In FIG. 1, end support towers 12 and 14 support a central structure 16 equivalent to an axle, which is centered on an axis 4. Structure 16 includes a box beam 18 and at least one circular bearing 20, better seen in FIG. 2. First and second spaced-apart, mutually parallel fixed trusses or beams 22 and 24 are affixed to, and extend from box beam 18 horizontally toward one side of the structure, and have sufficient room between the beams to accommodate a circular support mandrel 26. Circular support mandrel 26 is rotatable about box beam 16 on bearing 20, and is driven by a motor 27 and cog 28, which engages a circular gear (not illustrated). A controllable purge or gas chamber 32 is affixed to the end of beam 22 remote from box beam 18, and a controllable purge chamber 34 is affixed to the end of beam 24. Beams 22 and 24 hold the controllable purge chambers 32 and 34, respectively, adjacent the centerline 36 of the weld head 38.

The workpiece to be welded in the arrangement of FIG. 1 consists of a tank 8 made up of a plurality of thin cylindrical shells or sheets 40, 42, 44, and hemispherical end caps 46 and 48. These cylindrical shells are fabricated by welding together sections of cylinders, so that each cylindrical shell which is to be welded in accordance with the invention already has seams, some of which are designated 98 in FIG. 1. These cylindrical shells are also so thin, about 0.080 inch, that they tend to sag due to gravitational effects, and to therefore take on a non-circular shape, in the absence of support. In order to provide additional support for the tank 8 in its fabricated state, each thin cylindrical shell or hemispherical cap section 40, 42, 44, 46, and 48, is affixed to its adjacent portion of tank 8 by means of an intermediary support ring. In FIG. 1, the support rings are designated 60, 62, 64, and 66. Thus, for example, cylindrical shell 40 abuts, and is welded to, one edge of a support ring 66, and hemispherical end piece 46 abuts, and is welded to, the other edge of support ring 66. Similarly, the edges of cylindrical shell 40 and 42 abut opposite edges of support ring 64, and are butt-welded thereto. The support rings 60–66 are about 8 inches wide, and 0.080 inches thick, and include a reinforcing rib as described below.

One or two seams may be welded at a time, namely one or both of those seams which are associated with one of the support rings 60–66. Consequently, welding may be performed on one edge of one of support rings 60–66 and the adjacent abutting edge of one of cylindrical shells 40–44 or end caps 46, 48, or welding may be performed on one edge of one of support rings 60–66 and the adjacent abutting edge of one of cylindrical shells 40–44 or end caps 46, 48, while at the same time, welding is also performed on the other edge of the same one of support rings 60–66 and the adjacent abutting edge of one of cylindrical shells 40–44 or end caps 46, 48. For example, the seam between cylindrical shell 40 and support ring 64 may be made, followed by a weld of the other edge of support ring 64 to adjacent cylindrical shell 42, or welds may be made simultaneously to both edges of support ring 64. If one edge is welded at a time, it is undesirable to disassemble the support structure to move it to the other edge of the support ring to make that weld, because of the need to realign all of the structures to within the desired tolerances. Consequently, two purge chambers 32, 34 are provided even if the welds are to be made individually, so that both welds can be made with the aid of an atmosphere of inert gas.

Support for the edges of the support rings and of the cylindrical shells to which they are to be welded is provided by two sets of radial adjusters, designated 50 and 52 in FIG. 2, associated with support mandrel 26. Set 50 of radial adjusters is adjacent the edge of cylindrical shell 40, and set 52 of radial adjusters is adjacent the abutting edge of support ring 64. The radial adjusters in a preferred embodiment of the invention are threaded screws, illustrated in greater detail in FIG. 3, which are individually adjustable in a radial direction. The radial screws allow the cylindrical shell to be juxtaposed to the support ring, with the outer surfaces aligned to within the desired 0.003 inches, notwithstanding their tendency to sag, and notwithstanding the difference in thickness between the two adjacent rings which are to be joined.

So far not yet described in conjunction with FIG. 1 are external compression bands, two of which are illustrated as 72a and 72b, which surround and compress the cylindrical shells and support rings against the support structure on the interior, leaving the seams exposed so that they can be welded. These compression bands provide additional support to the structure both before and after it is welded, and are removed before the tank is used.

Figure 3:
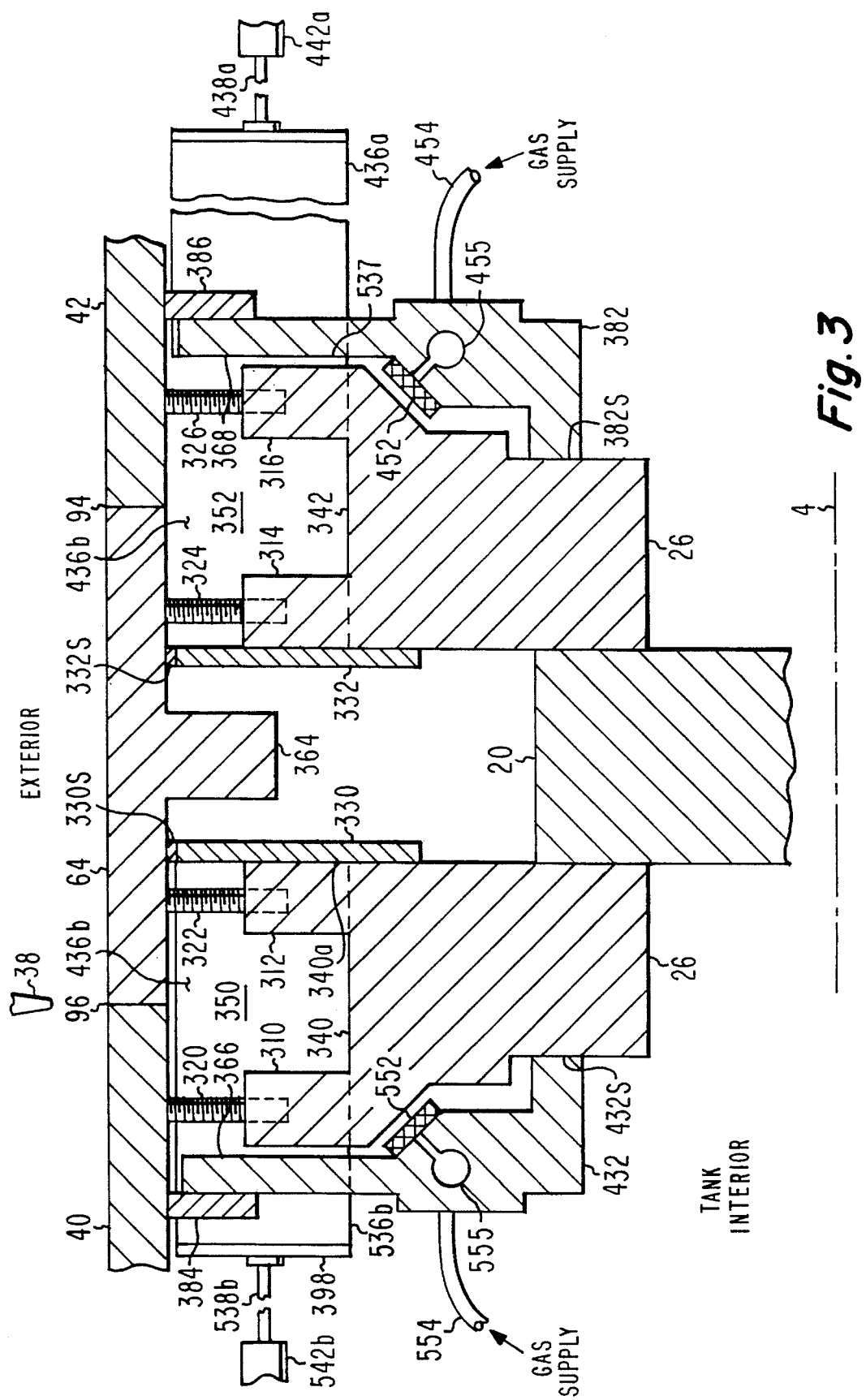
FIG. 3 is a highly simplified edge view of a workpiece consisting of two adjacent cylindrical shells, a support ring, and the associated portion of the support structure.

FIG. 3 is a highly simplified cross-sectional or edge view of two adjacent cylindrical shells and their associated support ring, illustrating how the adjustment screws support the surfaces of the sheets and rings in position. Elements of FIG. 3 corresponding to those of FIGS. 1 or 2 are designated by the same reference numerals. In FIG. 3, an edge view of cylindrical shells 40 and 42 illustrates support ring 64, seen in cross-section, with its reinforcing rib 364. Also visible in FIG. 3 is a cross-section of circular support structure 26, and of the bearing 20 on which it rotates. Also in FIG. 3, threaded screw support bosses 310, 312, 314, and 316 are supported by integral circular support structure 26. Screws 320, 322, 324, and 326 are threaded into bosses 310, 312, 314, and 316, respectively, and project sufficiently to engage the interior surfaces of cylindrical shells 40, 42, and support ring 64. The edge of the butt junction between cylindrical shell 40 and support ring 64 is designated 96, and the corresponding butt junction between support ring 64 and cylindrical shell 42 is designated 94. These are the junctions which are to be welded.

FIG. 3 also illustrates two 360° vanes or side plates 330, 332, which extend completely around the interior of support structure 26, with their outer edges contiguous with the interior surface 364 of support ring 64. In this context, the term "contiguous" means "adjacent to and in physical contact with" or "adjacent to and not in physical contact with". The salient requirements are that the flow of gas through the gap between the outermost edge of 360° vanes 330, 332 and the adjoining inner surface portion of support ring 64 should be relatively low. For this purpose, a gasket or sealing member 330S and 332S is associated with vanes 330 and 332, respectively. Since the vane does not move with respect to the cylindrical shells or the support ring, the seal is not difficult to make. Each vane 330, 332 is supported by support structure 26.

A further set of structures illustrated as 382 and 432 are supported by trusses 22 and 24 of FIG. 2 (not visible in FIG. 3) in a position which is fixed relative to the rotating cylindrical shells and support structure 26. To allow for this motion, structures 382 and 432 of FIG. 3 are spaced away from rotating support structure 26, except at a seal surface 382S associated with structure 382, and a seal surface 432S associated with structure 432. Structures 382 and 432 are contiguous with the inner surfaces of cylindrical shells 42 and 40, respectively, and sealing is aided by seals 386 and 384, respectively.

The 360° vanes 330, 332, possibly together with other structures, each form a part of one wall of an associated purge chamber. The purge chamber associated with vane 330 in FIG. 3 is designated generally as 350, and the purge chamber associated with vane 332 is designated as 352. The surface of 360° vane 330 facing purge chamber 350 is perpendicular to the interior surfaces of cylindrical shells 40 and 42, and also perpendicular to at least a portion of the interior surface of support ring 64, in the local view of FIG. 3. Similarly, the surface of 360° vane 332 facing purge chamber 352 is perpendicular to the interior surfaces of cylindrical shells 40 and 42, and also perpendicular to at least a portion of the interior surface of support ring 64. Thus, vanes 330 and 332 are perpendicular to the axis 4 of bearing 20. The interior surface portions of cylindrical shell 40 and support ring 64 adjoining purge chamber 350 make up another wall of the purge chamber, and a rear (relative to the exterior of the tank) wall 340 of purge chamber 350, interrupted by bosses 310 and 312, is formed by a portion of support structure 26, as can be seen in FIG. 3. Rear wall 340, in the regions which are not interrupted by bosses, has an edge 340a which is contiguous with the adjacent vane 330, so that gas cannot flow past the junction of vane 330 and support structure 26. Rear wall 340 is at a predetermined distance from cylindrical shell 42 and support ring 64. Similarly, the interior surface portions of cylindrical shell 42 and support ring 64 adjoining purge chamber 352 make up another wall of the purge chamber, and a rear wall 342 of purge chamber 352, interrupted by bosses 314 and 316, is formed by another portion of support structure 26. Rear walls 340 and 342 extend essentially parallel to the corresponding interior surface portions of cylindrical shells 40,42 and of support ring 64. More specifically, vane 330, wall 340 of support structure 26, and those portions of cylindrical shell 40 and support ring 64 which are adjacent to butt junction 96 make up three walls of a roughly rectangular purge chamber 350, of which only a portion can be seen because of bosses 310, 312. Similarly, vane 332, wall 342 of support structure 26, and those portions of cylindrical shell 42 and support ring 64 which are adjacent to butt junction 94 make up three walls of another purge chamber 352. Both purge chambers are on the inside of the tank, on the opposite side from welding head 38.

A fourth wall of purge chamber 350, as seen in FIG. 3, is designated 366, and is a part of fixed structure 432. Wall 366 extends perpendicular to the interior surface of cylindrical shell 40 in the region illustrated in FIG. 3. A corresponding surface 368 of structure 382 forms at least a portion of the fourth wall of purge chamber 352. The two remaining walls which are required to close each of the purge chambers are made by a plurality of movable gates or tongues, controlled by cables. In FIG. 3, a first gate 536b is illustrated in its inserted position, in which it extends all the way from structure 432 on the left of purge chamber 350 to butt against wall 330 at the right of chamber 350. The position of gate 536b is controlled by a cable 538b which is attached to gate 536b at a flange 398. Also in FIG. 3, another gate 436a is illustrated in its retracted position, in which its control cable 438a pulls the gate to a position which places that edge of gate 537, which is remote from cable 438a, flush with wall surface 368 of purge chamber 352. With gate 436b in its retracted position, the surface of another gate 436b, which is in the inserted position, may be seen at the far end of purge chamber 352. Each purge chamber is associated with at least three gates, any two of which are always in the inserted position, to close off the two controllable sides of the purge chamber, while another gate may be retracted to clear a screw mounting boss such as 310 or 312.

Also visible in FIG. 3 is a pipe 454, which conducts inert gas to a plenum 455 extending through structure 432. Plenum 455 communicates with a diffuser 452, which allows the inert gas to enter purge chamber 350 by way of the gap between structure 432 and support structure 26. A similar arrangement, including pipe 554, plenum 555, and diffuser 552, is associated with purge chamber 352.

Figure 4:
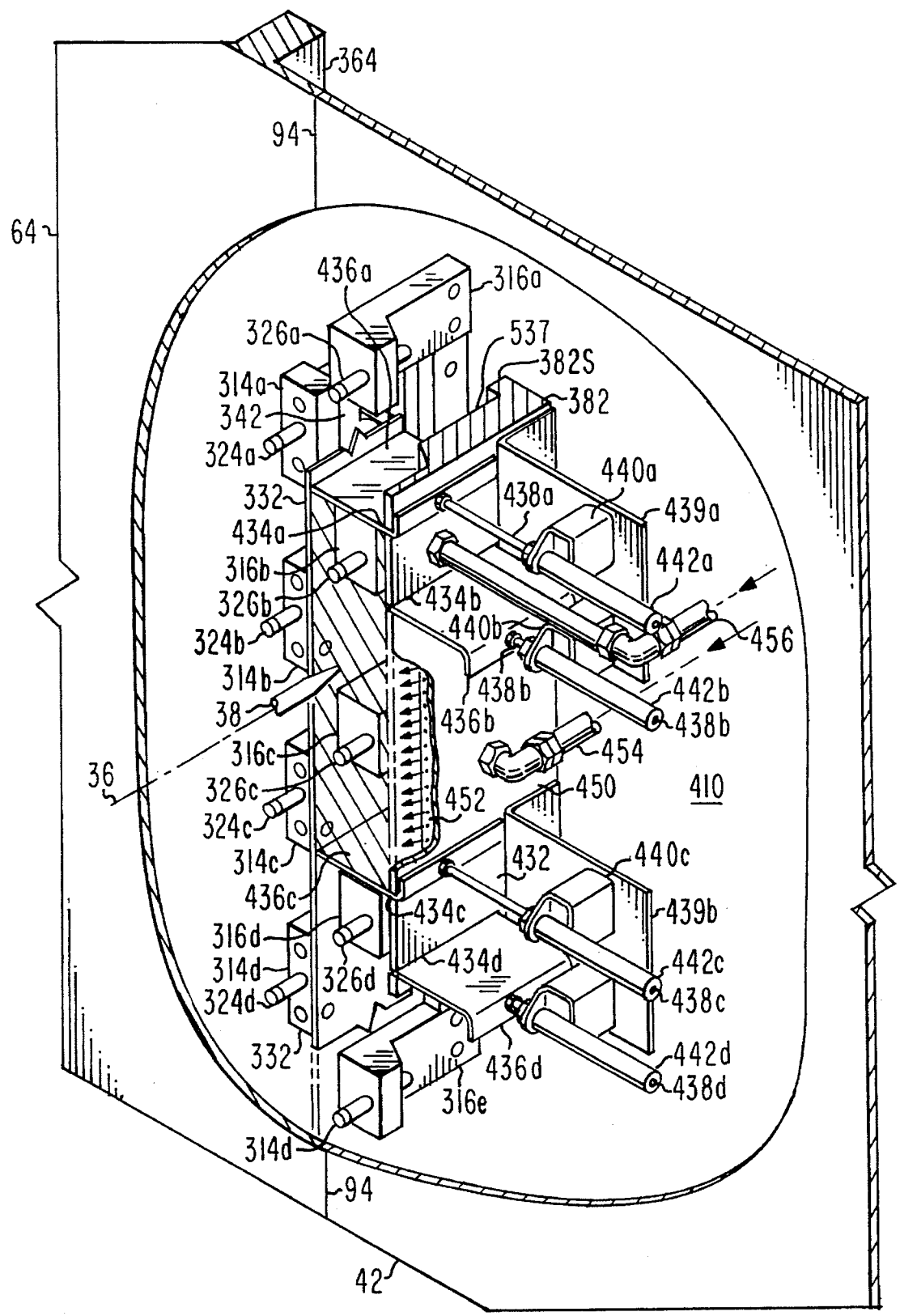
FIG. 4 is a perspective or isometric view of a purge chamber in accordance with the invention, separate from the workpiece, and showing the relative location of the welding head during operation.

FIG. 4 is a perspective or isometric view, in somewhat more detail, of the welding arrangement of FIGS. 1, 2, and 3, with the workpiece consisting of cylindrical shell 42 and support ring 64 cut away along juncture 94 to reveal those portions of the vane 332 and support structure 26 associated with purge chamber 352, together with other portions of the structure of the purge chamber, and ancillary structures. In FIG. 4, several bosses 314a, 314b, 314c, and 314d, and their corresponding adjustment screws 324a, 324b, 324c, and 324d, are illustrated in the positions which they take, extending parallel to junction 94, for supporting support ring 64 in position. Similarly, bosses 316a, 316b, 316c, and 316d are illustrated, holding their corresponding radial adjustment screws 326a, 326b, 326c, and 326d, as would be required to hold cylindrical shell 42 in position. Vane 332 is positioned adjacent boss set 314, extending perpendicular to the local inner surface of support ring 64, and also perpendicular to the projection of the local inner surface of cylindrical shell 42. Structural element 382 is slotted, and extends parallel to vane 332, but on the side of boss set 316 remote from junction line 94. Thus, as mentioned, vane 332 acts as a side or wall of purge chamber 352, and structural member 382 is, in principle, a corresponding opposite wall. As illustrated in FIG. 4, structural member or wall 382 is slotted, having mutually parallel transverse slots 434a, 434b, 434c, and 434d, through which corresponding gates or tongues 436a, 436b, 436c, and 436d may extend. Gates 436a and 436c are illustrated in their "inserted" positions, in which they extend through their corresponding slots, and into contiguous relationship with vane 332. Gates 436b and 436d are illustrated in their "retracted" positions, in which the gates are withdrawn so that only their tips occlude the aperture of their corresponding slots, to tend to block the flow of gas through the slot. The purge chamber 352 in FIG. 4 is the volume indicated by hatching, and extending between the vane 332 and slotted wall 382, and between upper inserted gate 436a and lower inserted gate 436c. As mentioned, the "back" wall of the purge chamber is a portion of slotted structure 382.

In FIG. 4, gate 436a is actuated by a mechanical cable 442a, which terminates at a support bracket 440a, and which has an actuation cable 440a extending to a lip on gate 436a. Mechanical cable 442a may be actuated from a remote location by a solenoid, hydraulic cylinder, motor, or the like, under control of a proximity sensor, as described below. In a similar manner, mechanical cable 442b is supported by a bracket 440b, and has a central actuator cable 438b which extends to a lip on gate 436b. Mechanical cables 442c and 442d are supported by brackets such as 440c and 440d, and include actuator cables 438c and 438d which are connected to gates 436c and 436d, respectively.

In FIG. 4, inert gas is introduced into purge chamber 410 by way of a gas pipe 454, which allows inert helium gas to enter plenum 455 (not visible in FIG. 4) and to be coupled to a porous diffuser chamber 452. The diffuser chamber receives the inert gas from a pipe 454, and allows the gas to enter the purge chamber evenly, as mentioned above, by way of a gap in the structure. The helium gas is light, and tends to rise through the purge chamber. This tendency is counteracted by allowing a mixture of inert argon gas and inert helium gas to enter the upper end of the purge chamber by way of a pipe 456. The argon gas is heavier than helium, and its weight tends to hold the underlying helium gas in place. No exhaust port is necessary, as the structure has sufficient gaps associated with the seals so that the inert gas leaks out, but oxygen is purged from the interior of the purge chamber.

Figure 5A:
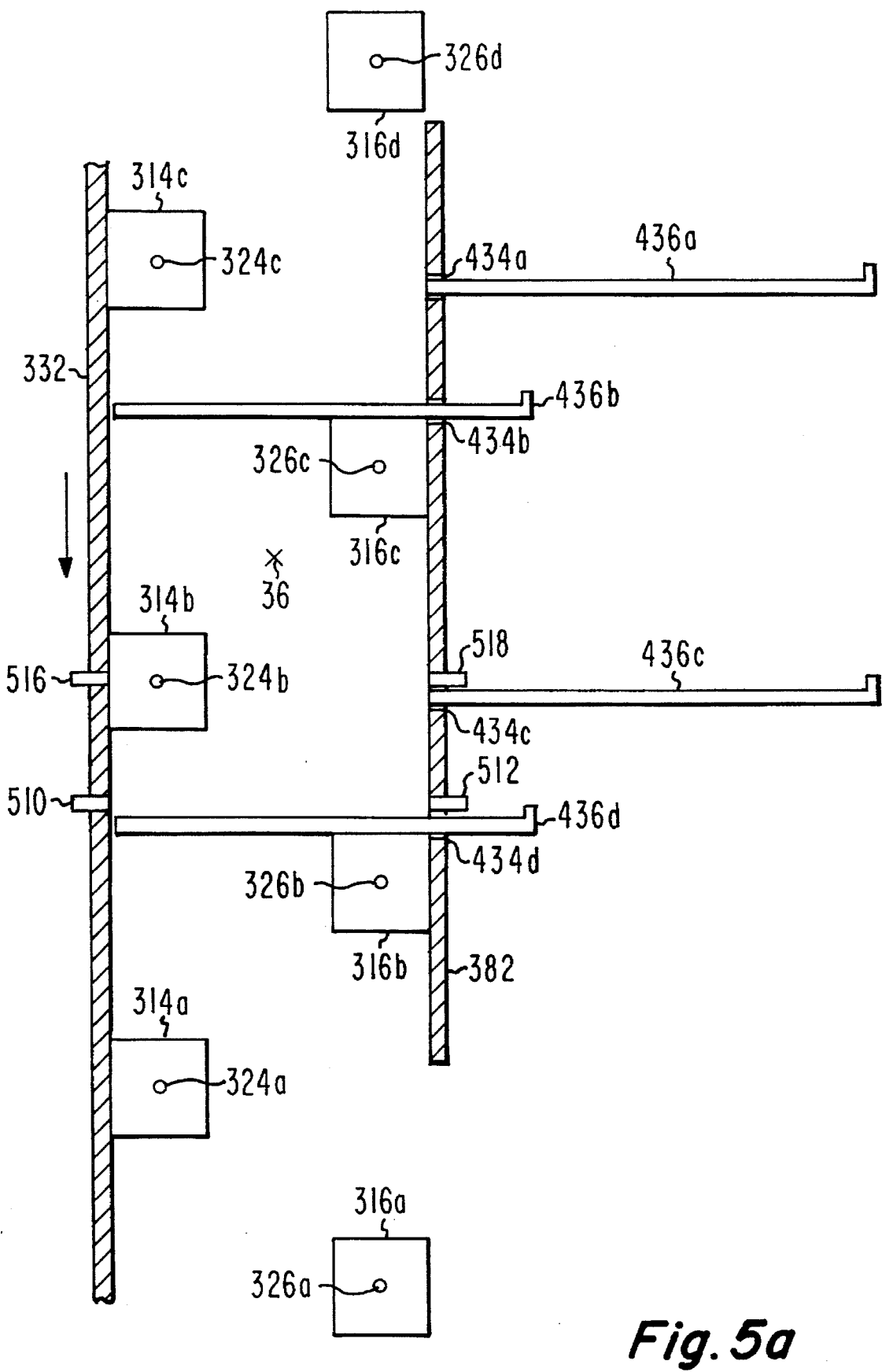
FIGS. 5a, 5b, 5c, 5d, 5e, 5f, 5g, 5h, 5i, 5j and 5k are simplified developed views of the controllable chamber in various positions of the workpiece support.

FIGS. 5a–5i (where the hyphen represents the word "through") are simplified representations of the positions of the various screw support bosses 316 and 324, as developed from a cylindrical surface to the plane of the FIGURES, together with the inserted and retracted positions of the gates 436 of the arrangement of FIGS. 1, 2, 3, and 4 at various times during their sequential operation. In FIG. 5a, vane 332 moves downward relative to structure 382, carrying with it bosses 314 and 316. As illustrated in FIG. 5a, bosses 314a, 314b, and 314c are interleaved in the direction of motion with bosses 316a, 316b, 316c, and 316d. Each boss bears a screw 324 or 326, seen in end view. In FIG. 5a, gates 436a and 436c are in their retracted positions, in which their tips occlude their respective slots 434a and 434c; gates 436b and 436d are in their inserted positions, with their tips contiguous with vane 332. The purge chamber is defined between the inserted gates 434b and 434d. The axis 36 of the welding head lies half-way between gates 436b and 436c. Two bosses are located within the purge chamber, namely bosses 316c and 314b, and boss 316c has its upper side contiguous with the lower side of gate 436b. Another boss 316b has its upper side contiguous with the lower side of lowermost gate 436d, but boss 316b is not within the purge chamber. Also illustrated in FIG. 5a is a first proximity sensor, illustrated as a light source 512 and a light sensor 510, and a second proximity sensor, illustrated as a light source 518 and light sensor 516. In the illustrated positions of the bosses, light sensor 510 receives light from source 512, and produces an output indicating that the bosses are not at gate 436d, while sensor 516 indicates that a boss is near gate 436c. As described below in conjunction with FIGS. 6 and 7a–7c, a control circuit, in the position of the gates illustrated in FIG. 5a, does not respond to the signal from sensor 516.

Figure 5B:
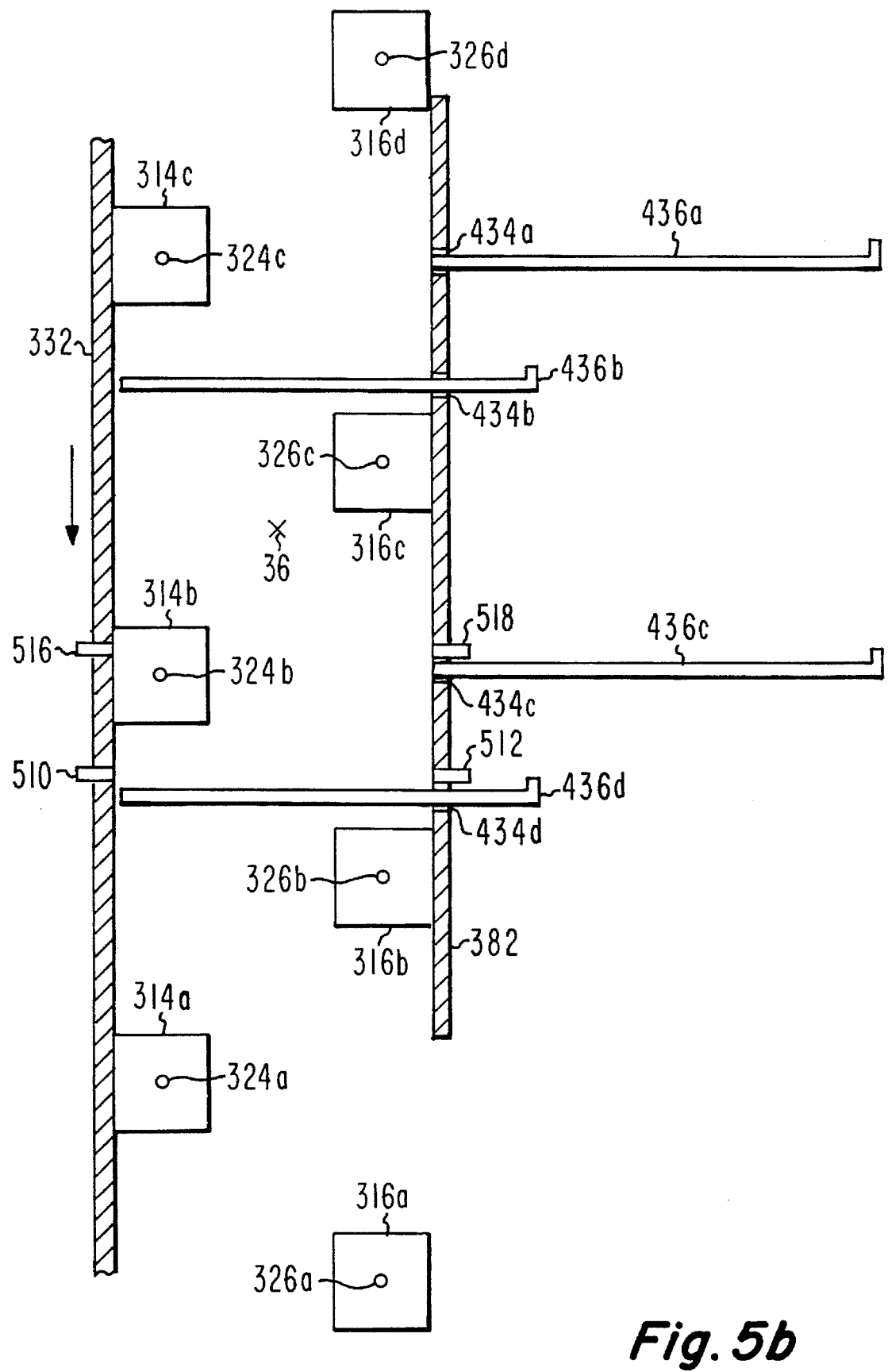
Figure 5C:
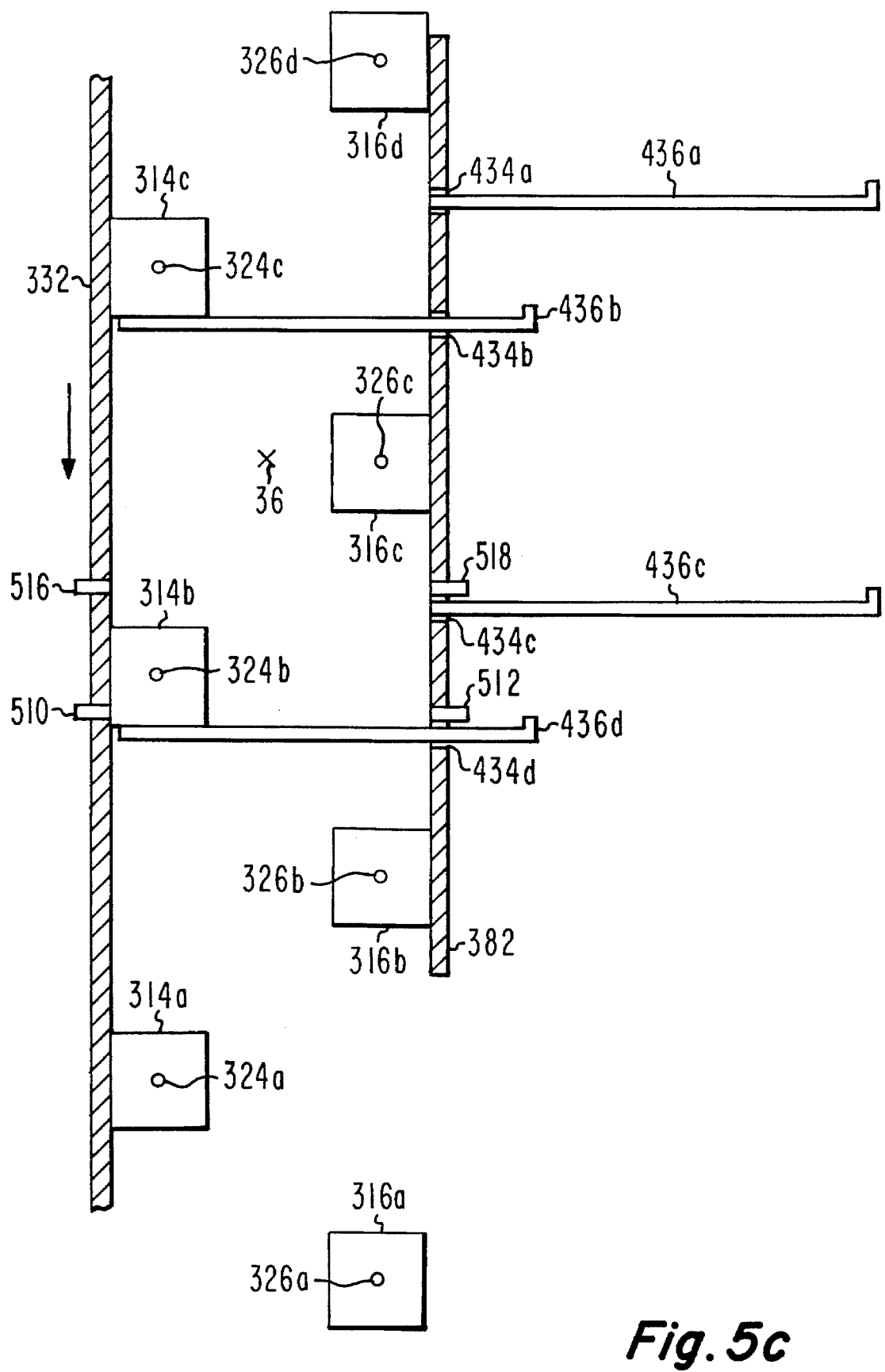
Figure 5D:
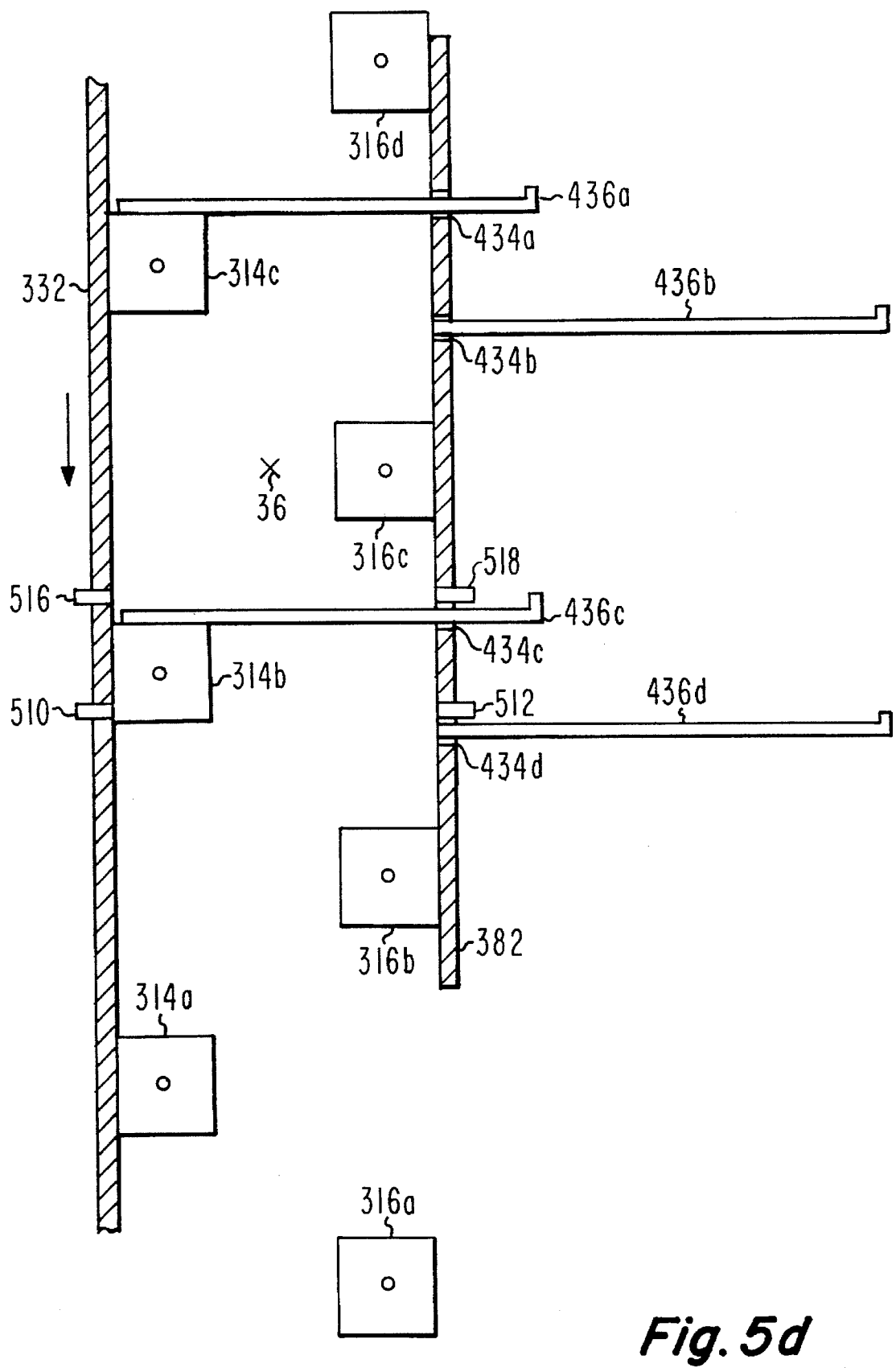

FIG. 5b represents the arrangement of FIG. 5a after a short interval. In FIG. 5b, vane 332 has moved downward relative to slotted structure 382, carrying bosses 314 and 316 with it. The upper side of boss 316c can be seen to have moved downward relative to gate 436b, but it remains within the purge chamber. The lower side of boss 314b is approaching the upper side of inserted gate 436d, and also is within the purge chamber. Boss 316b is receding from the lower side of inserted gate 436d. Light sensor 510 still receives light from source 512, and produces an output signal; the output signal from light sensor 516 is not used. A moment later, the lower edges of bosses 314b and 314c become contiguous with the upper sides of inserted gates 436d and 436b, respectively, as illustrated in FIG. 5c. At this time, proximity sensor 510 receives no light, and its output drops or makes a negative-going transition, indicating that a boss is adjacent gate 436d. Because the interval between bosses 314 equals the spacing between gates 436b and 436d, the sensing of boss 314b as contiguous to gate 436d corresponds to the position of boss 314c contiguous to gate 436a. The sensed boss positions cause the retracted and inserted positions of the gates 436a–436d to reverse, as illustrated in FIG. 5d. The control circuit, as described below, now ignores the signal from sensor 510, and responds only to a negative-going transition of the signal from sensor 516.

Figure 5E:
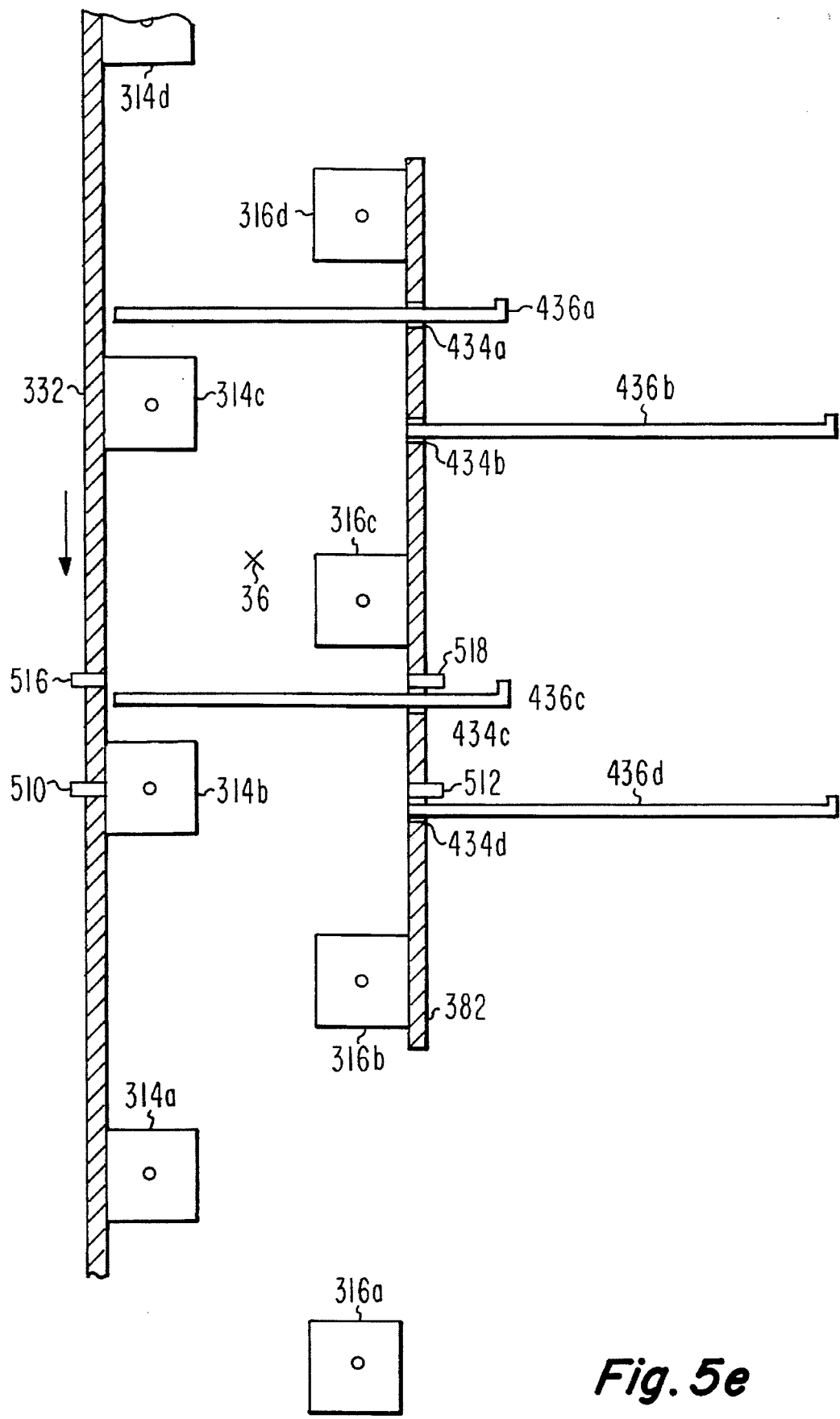
Figure 5F:
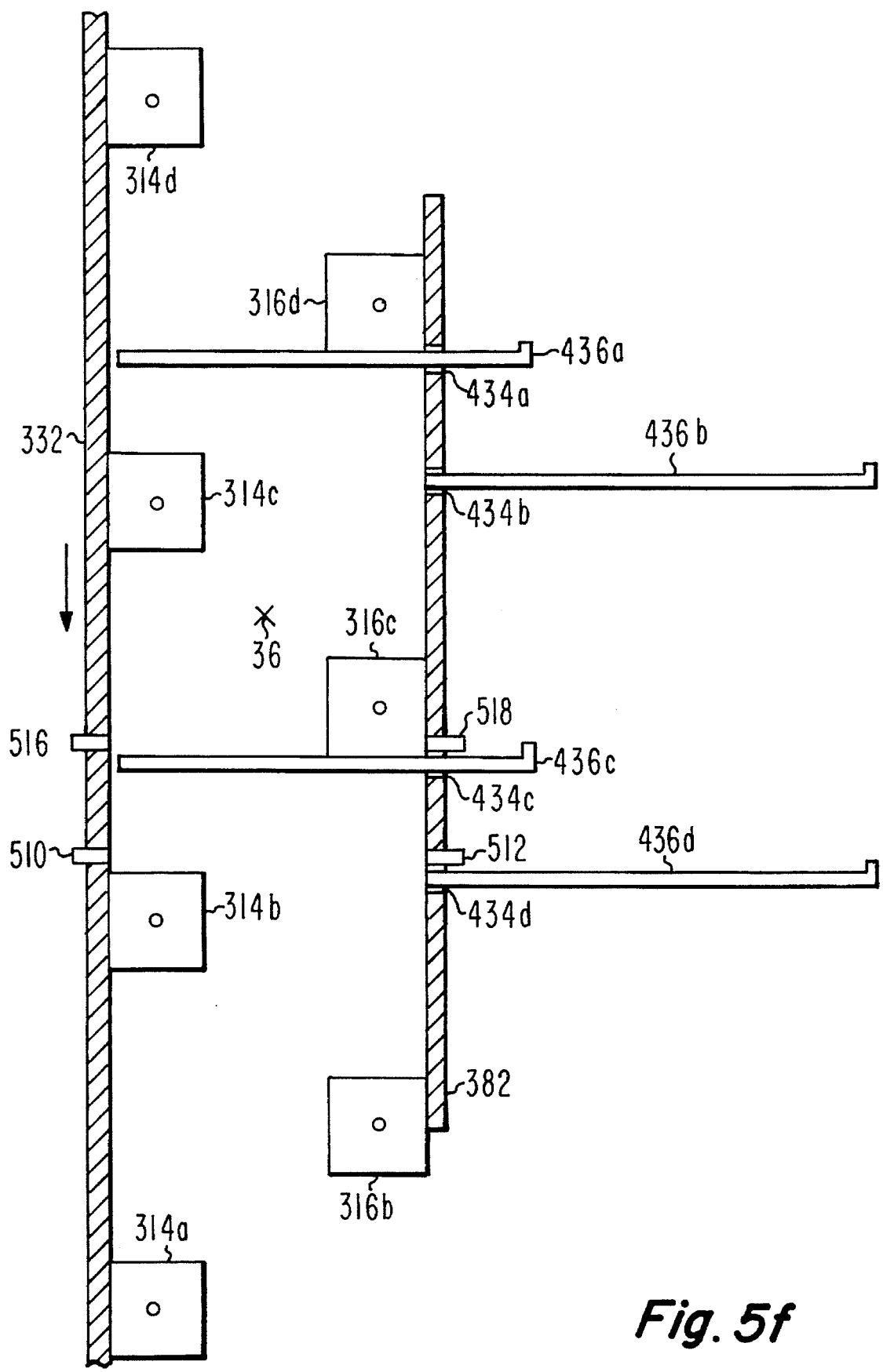
Figure 5G:
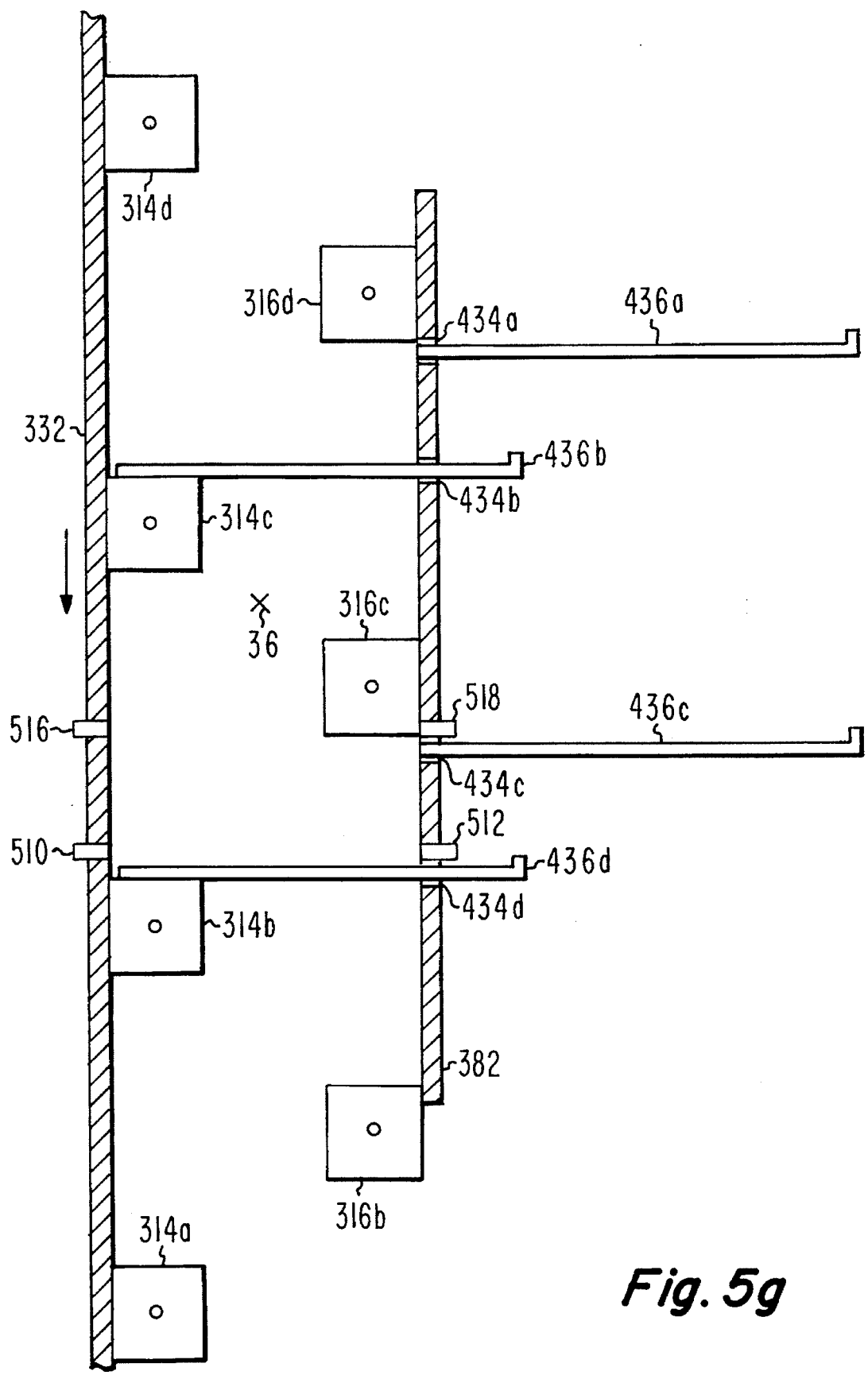
Figure 5H:
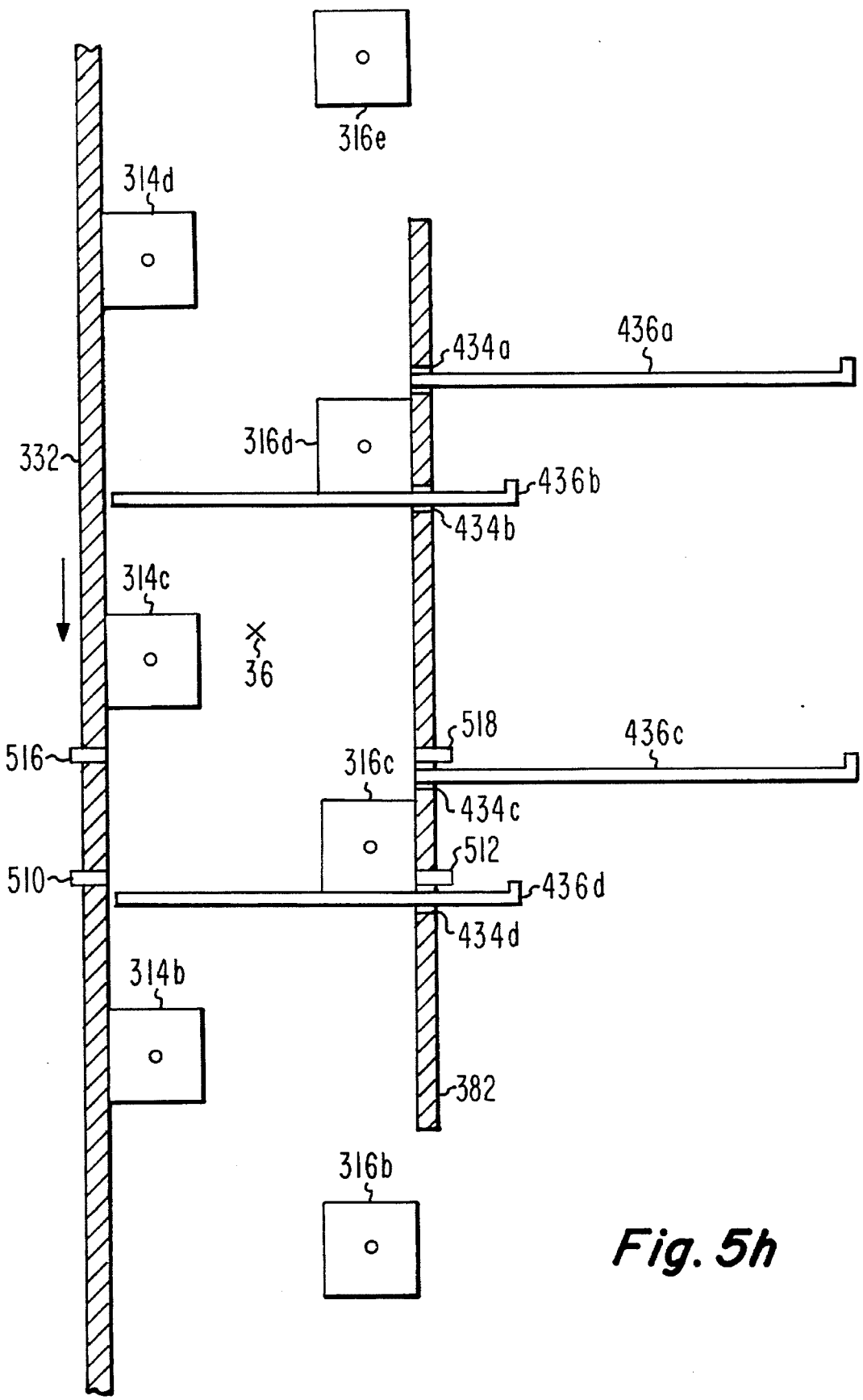
Figure 5I:
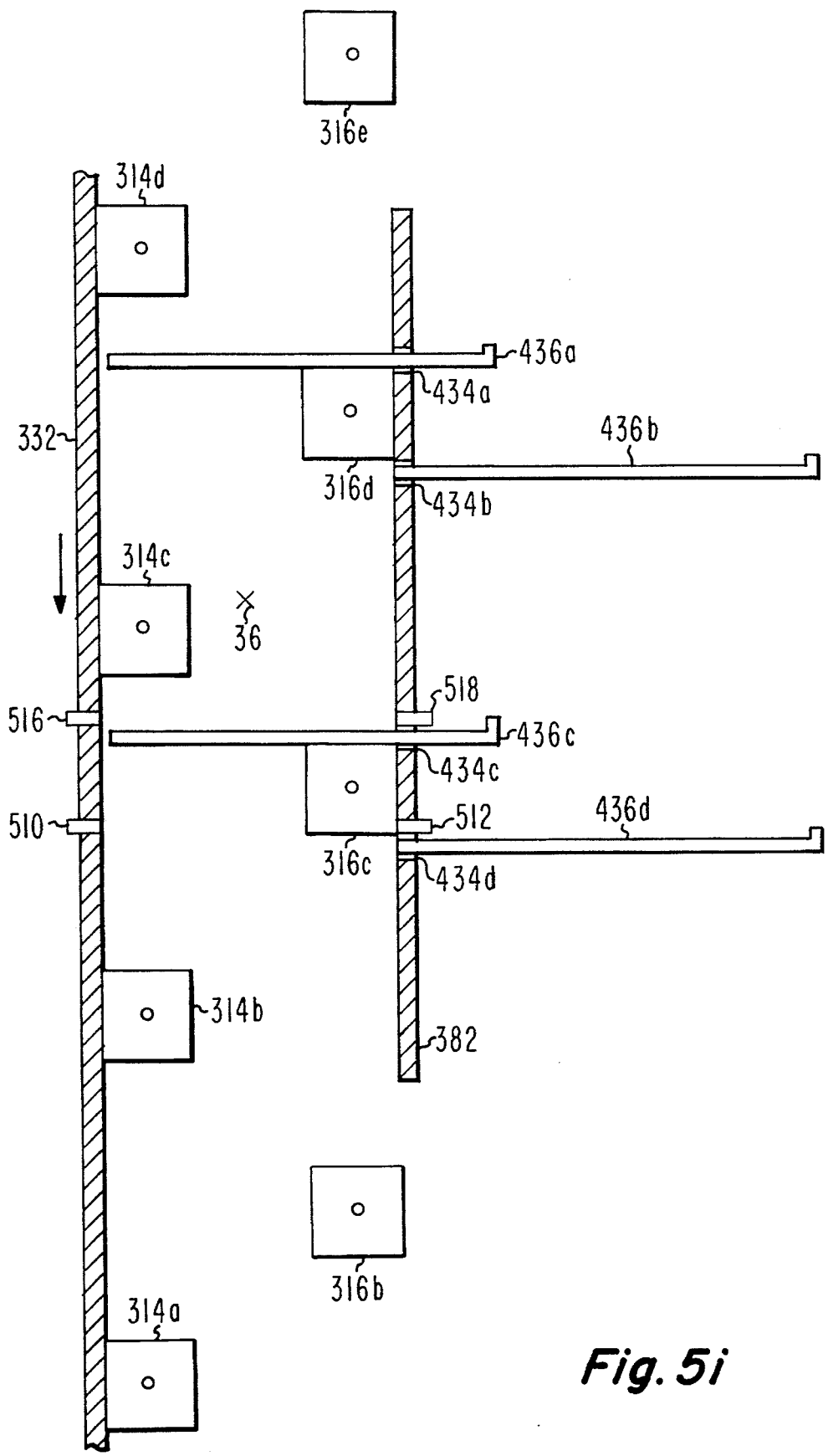
Figure 5J:
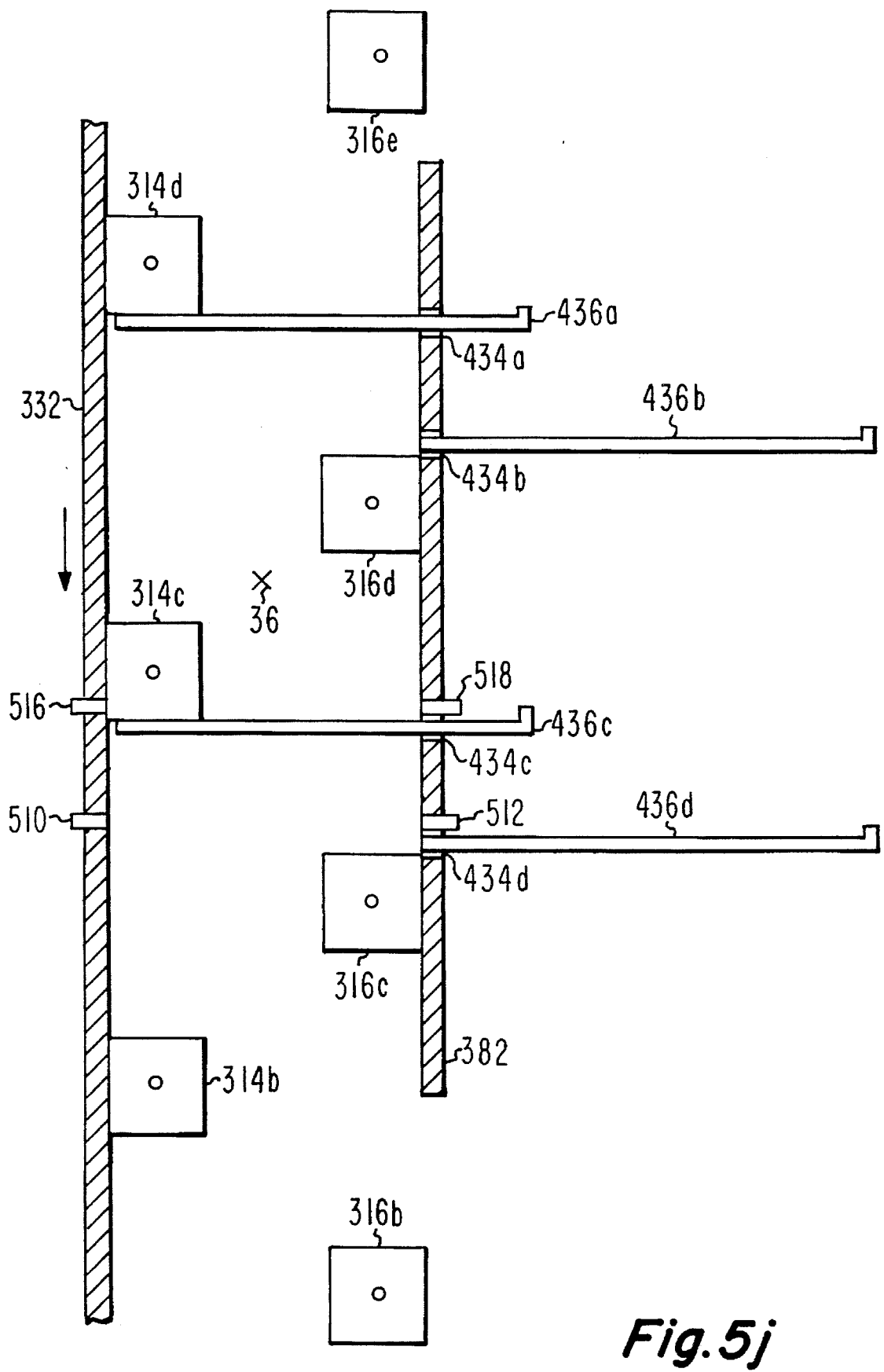
Figure 5K:
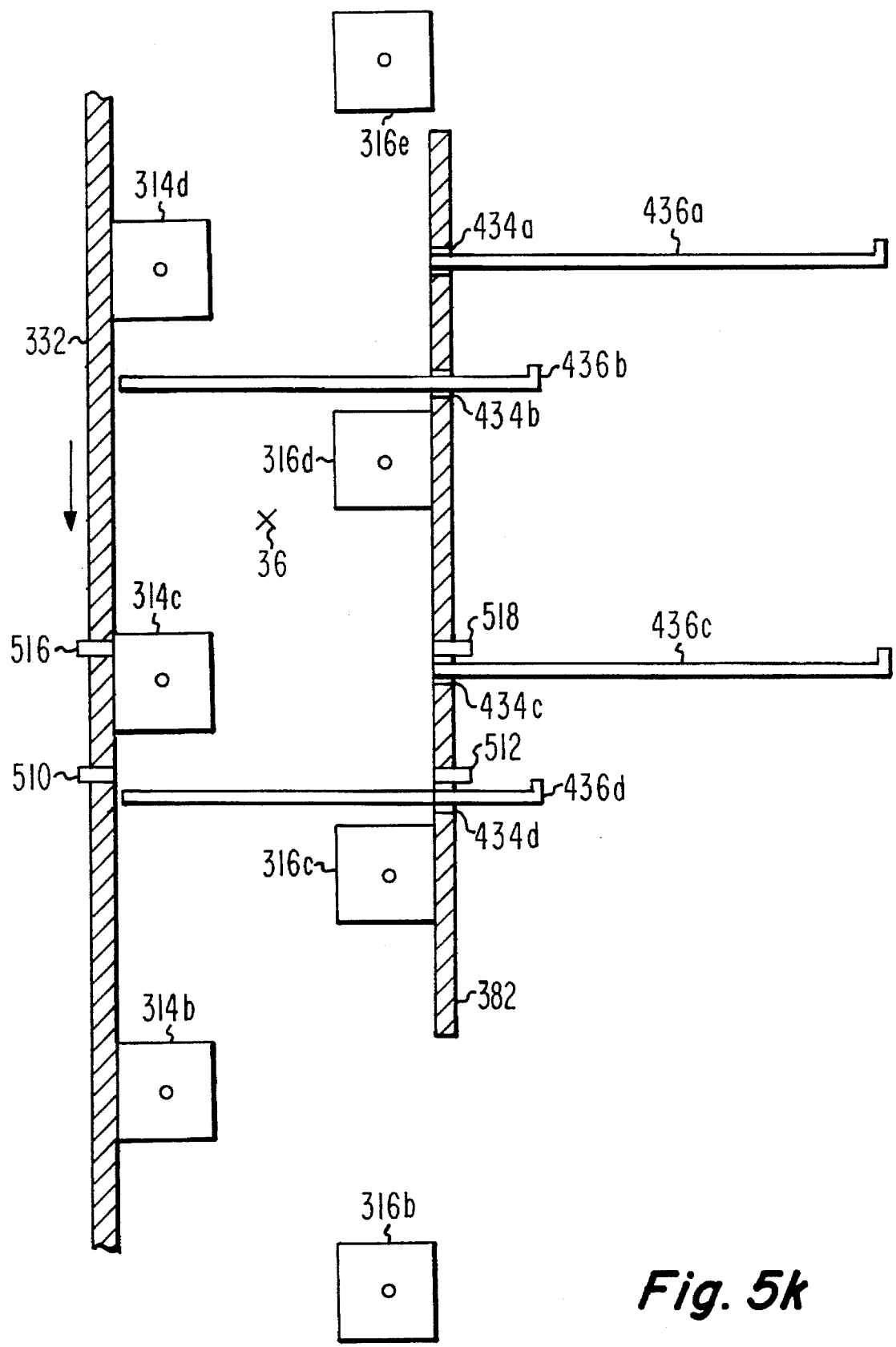

In FIG. 5d, gates 436a and 436c are inserted, and gates 436b and 436d are retracted. The motion of gate 436a has placed boss 314c within the purge chamber, and the motion of gate 434c places boss 314b without the purge chamber. A closed purge chamber continues to exist, but now between inserted gates 436a and 436c. In these positions of the gates, the bosses may continue to move downward relative to the gates. The gate position switching may result in a slight dilution of the inert gas in the purge chamber with oxygen-containing air, but the effect is slight, and the diluent is rapidly purged. Immediately after the gates switch position, boss 314b continues to prevent light from reaching sensor 510, but with the gates in the positions illustrated in FIG. 5d, its signal is ignored, and control is now established in sensor 516. FIG. 5e represents a position of vane 332 and bosses 324, 316 midway between the positions illustrated in FIG. 5d and FIG. 5f. In FIG. 5f, the lower edges of bosses 316c and 316d have become contiguous with the upper sides of inserted gates 436c and 436a, respectively, and the light to sensor 516 is cut off, resulting in a negative-going transition in the sensor signal. This transition indicates that the positions of the gates must once again be switched, in order to allow motion to continue. FIG. 5g represents a moment after that of FIG. 5f, and illustrates gates 436b and 436d switched to the inserted state, and gates 436a and 436c switched in the retracted state, thereby allowing the bosses to continue to move downward. In this state of the gates, the control circuit is no longer responsive to the signal from sensor 516, but responds instead to negative-going transitions of the signal from sensor 510. Sensor 510 is receiving light, and is producing an output signal. Bosses 314c and 316c are within the purge chamber. In FIG. 5h, the lower surfaces of bosses 316c and 316d have moved downward to a position which is contiguous with the upper surfaces of gates 436d and 436b, respectively. Light to sensor 510 is cut off, and the negative-going transition of its output indicates that the gate position must again be switched to allow motion to continue. FIG. 5i represents the gates in their switched positions, with gates 436a and 436c inserted, and with gates 436b and 436d retracted, to thereby include bosses 316d and 314c within the purge chamber, to exclude boss 316c from the purge chamber, and to make the control system sensitive to the signal from sensor 516. FIG. 5j represents the result of further motion of the bosses in a downward direction, bringing the lower surfaces of bosses 314d and 314c within the purge chamber into contiguous relation with the upper surfaces of gates 436c and 436a, respectively, thereby blocking light flow between source 518 to sensor 516, and causing a negative-going transition. The gates switch in response to the transition. At a time after the gate switching, the boss position, illustrated in FIG. 5k, displays the same state as that of FIG. 5a, except that a different set of the bosses, namely bosses 314c and 316d, is in position to continue through the purge chamber. The cycle of operation illustrated in FIGS. 5a–5k is repeated as many times as are necessary to cause all of the bosses to cycle through the purge chamber, so that welding can occur along the juncture of the two sheets of material along axis 36.

Figure 6:
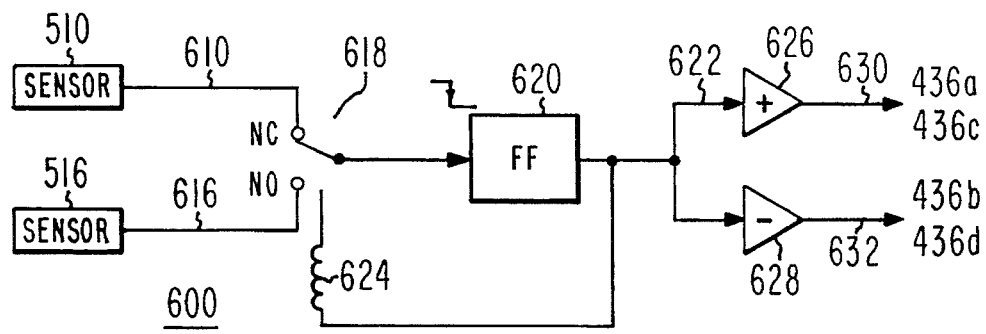
FIG. 6 is a simplified block diagram of the control arrangement for operating the movable gates of the controllable chamber in response to the positions of the adjusting screw support bosses, as sensed by proximity sensors.

FIG. 6 is a simplified block diagram of a control circuit 600 which performs the control described in conjunction with FIGS. 5a–5k. In FIG. 6, sensor 510 couples its output signal over a signal path 610 to the normally-closed (NC) contacts of a relay 618, and sensor 516 couples its output signal over a path 616 to the normally-open (NO) contact. The movable element of relay 618 is coupled to the input port of a flip-flop (FF) 620, which switches state in response to a negative-going transition at its input port. The output of FF 620 is coupled back to control an actuating coil 624 of relay 620, and is also coupled by a path 622 to a noninverting driver 626 and an inverting driver 628. Driver 626 applies its drive signal by a path 630 to a solenoid (not illustrated) which actuates the cables attached to gates 436a and 436c. Inverting driver 628 drives applies its drive signal by a path 632 to a solenoid (not illustrated) which actuates cables attached to gates 436b and 436d.

Figure 7A:
FIGS. 7a, 7b, and 7c are time plots of various control signals associated with the control arrangement of FIG. 6.
Figure 7B:
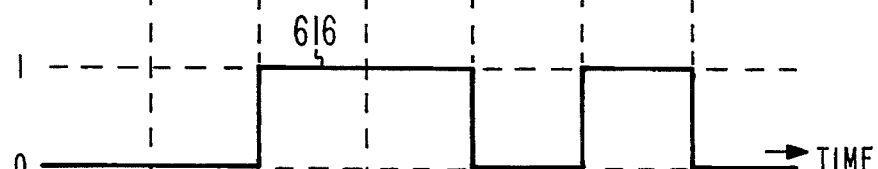
Figure 7C:
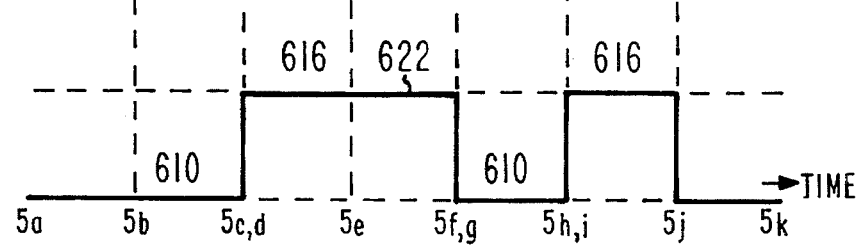

FIGS. 7a, 7b, and 7c illustrate control waveforms associated with FIG. 6, in a time frame represented by FIGS. 5a–5k. In FIG. 7a, plot 610 represents the signal of sensor 510 on conductor 610 of FIG. 6, while plot 616 of FIG. 7b represents the signal of sensor 516 on conductor 616 of FIG. 6. More specifically, at the time of FIG. 5a, at the left of FIGS. 7a, 7b, and 7c, the signal on conductor 610 is logic high (or logic 1, or positive), and the signal on conductor 616 is logic low (logic 0, or negative). The state of FF 620 at that moment is such that its output is low, as indicated by plot 622 of FIG. 7c. With the output of FF 620 low, coil 624 is deenergized, and coil 618 is in the illustrated position, coupling the NC contact to the input port of the FF. Consequently, conductor 610 is coupled to the input port of the FF, and this relationship is indicated by the notation "610" adjacent plot 622 of FIG. 7c, in the time interval represented by 5a–5c,d. In the time interval represented by 5c,c to 5f,g of FIG. 7c, plot 622 is high, indicating that the output of FF 620 of FIG. 6 is logic high. With the FF output high, relay coil 624 is energized, and switches the movable contact of relay 618 to the NO contact, whereby the state of the FF becomes responsive to the signal on conductor 616, rather than to the signal from conductor 510, as suggested by the notation "616" adjacent plot 622 of FIG. 7c in the interval 5c,d to 5f,g. The state of FF 620 of FIG. 6 switches only in response to a negative-going transition in that one of the signals currently accessed by relay 618. More specifically, referring to FIGS. 7a, 7b, and 7c, the state of plot 622 (corresponding to the state of the FF) is responsive to signal 610 at times before time 5c,d, and switches at time 5c,d in response to the negative-going transition of plot 610 of FIG. 7a. At times after time 5c,d, the state of plot 622 is responsive to negative-going transitions in plot 616, which occurs at time 5f,g. After time 5f,g, the state of plot 622 is determined by a negative-going transition in plot 610, which makes such a transition at time 5h,i. Other aspects of the control should be obvious from the above description.

Other embodiments of the invention will be apparent to those skilled in the art. For example, the mandrel shaft may be vertical instead of horizontal. The tongues may be actuated by any type of motors, such as solenoids, pneumatic actuators, piezoelectric actuators, or the like. Any type of controller may be used to replace the controller of FIG. 6, so long as it provides the appropriate gate control. While light-actuated sensors are illustrated, the welding fumes may reduce the reliability of light transmission; mechanical switches may also be used.

What is claimed is

1. A welding apparatus for attaching a sheet of thin material to a second sheet of material, contiguous therewith, along a butt seam extending along an elongated edge of said sheet of thin material, said apparatus comprising:

an edge support arrangement, said edge support arrangement being located on a first side (interior) of said sheet of thin material and of said second sheet, and adjacent said edge of said sheet of thin material, said edge support arrangement including (a) a support structure spaced away from said sheet of thin material and said second sheet, said support structure supporting a plurality of threaded adjustment devices which extend, by no more than a predetermined distance, from said edge support arrangement to contact at least said sheet of thin material at locations adjacent to, but spaced away from said edge of said sheet of thin material, for supporting said edge of said sheet of thin material in a desired configuration, and also including (b) an elongated, gas impermeable vane defining at least one edge, said vane extending along said second sheet of material at a substantially fixed distance from said edge of said sheet of thin material, the body of said vane being contiguous with said second sheet, and projecting, adjacent to said threaded adjustment devices, perpendicular to a local surface defined by said first side of said sheet of thin material;

welding means located on a second side (exterior) of said sheet of thin material and of said second sheet, opposite to said first sides, for applying welding energy to said butt region between said sheet of thin material and said second sheet;

motive means coupled to said edge support arrangement and to said welding means, for causing relative motion between said welding means and said support structure, and said adjustment devices and sheets supported thereby, in a direction which causes said edge of said sheet of thin material to pass by said welding means, for being welded thereby to form said seam;

controlled chamber means located on said first sides of said sheet of thin material and of said second sheet, and fixed in position before said welding means, said controlled chamber means including (a) a gas impermeable rear wall, extending parallel to said sheet of thin material and to said second sheet, at a second distance from said sheet of thin material, which second distance is greater than said predetermined distance, said rear wall including an edge which is contiguous with a surface of said vane, whereby gas is inhibited from flowing past said edge of said rear wall which is contiguous with said surface of said vane; (b) a slotted wall including at least a portion extending (i) perpendicular to, and in contiguous contact with, said rear wall (340, 342), (ii) perpendicular to said first surface of said sheet of thin material, and contiguous therewith, and (iii) parallel with said vane, said slotted wall being located between said rear wall and said first surface of said sheet of thin material, said slotted wall defining at least first, second, and third spaced-apart, mutually parallel slots, each of which slots extends across said slotted wall from said rear wall to a location contiguous with said sheet of thin material, (c) first, second, and third movable gates, each of said first, second and third movable gates being dimensioned to fit through a corresponding one of said first, second, and third slots, and, when inserted into its slot, to extend from said slotted wall to be contiguous with said vane, and (d) control means coupled to said first, second, and third gates, for controlling said gates so that two of said gates are always in the inserted condition, to thereby define a chamber between (a) said sheet of thin material and said second sheet, (b) said vane, (c) said rear wall, (d) said slotted wall, and (e) said two of said gates, which chamber tends to retard the flow of gas between the interior and the exterior thereof; and a gas source coupled to said chamber, for tending to flood said chamber with said gas, whereby said first sides of said sheet of thin material, and of said second sheet, and said butt region therebetween, which are adjacent to said welding means, are exposed to said gas.

2. An apparatus according to claim 1, wherein said vane is supported by said support structure, so that said vane moves with said support structure and said second sheet, in relation to said welding means.

3. An apparatus according to claim 1, wherein said support structure is circular, and both said sheet of thin material and said second sheet are cylindrical, so that said edge of said sheet of thin material is circular.

4. An apparatus according to claim 1, wherein said threaded adjustment devices comprise screws.

5. An apparatus according to claim 1, wherein said source of gas is a source of inert gas.

6. An apparatus according to claim 1, wherein:

said edge support arrangement comprises an axle fixed in position relative to said welding means; and said support structure of said edge support arrangement comprises:

(a) a circular structure rotatably mounted on said axle, with said plurality of threaded adjustment devices extending radially, by no more than said predetermined distance, beyond said circular structure.

7. An apparatus according to claim 6, wherein said controllable chamber means is fixed in rotational position relative to said axle.

8. A welding arrangement for butt-welding first and second thin, cylindrical sheets of material together along a seam, said arrangement comprising:

a circular support mandrel, said mandrel including at least one radially adjustable support bearing against said first sheet of material at a location near said seam, said mandrel being rotatable relative to a base, and carrying said first and second sheets of material therewith;

a radially extending vane affixed to said mandrel and contiguous with said second sheet of material at a constant distance from said seam, said vane being located on a side of said radially adjustable supports which is remote from said seam, said vane being rotatable relative to said base in conjunction with rotation of said mandrel;

wall means, said wall means being in a fixed position relative to said base, and bearing against at least one of said mandrel, said first and second sheets, for defining a roughly tubular, open-ended cavity which remains fixed in position relative to said base, said wall means defining at least first, second and third slots, elongated in said radial direction;

first, second, and third gates, each of said gates being dimensioned to fit within a corresponding one of said first, second and third slots, and controllable to assume one of an inserted position and a retracted position, each of said gates, in said inserted position, closing off one side of said tubular cavity, so that any two of said gates, in their inserted positions, define a closed cavity within said tubular cavity and adjacent said seam;

weld enhancement gas supply means coupled to said closed cavity;

motive means for rotating said mandrel relative to said base, whereby said radially adjustable support is required to pass through said tubular cavity;

control means coupled to said gates, for maintaining two of said first, second, and third gates in said inserted position, and for causing said first gate to temporarily assume said retracted position when said radially adjustable support progresses to be contiguous therewith, whereby said radially adjustable support may progress past said first gate to a region between said first and second gates, and for causing said first gate to assume said inserted position after said radially adjustable support has progressed to said region, and for causing said second gate to temporarily assume said retracted position when said radially adjustable support has progressed to be contiguous with said second gate, so that said radially adjustable support may enter said tubular chamber without opening said closed cavity; and welding means coupled to said seam in a region adjacent to said closed cavity.

9. An arrangement according to claim 8, wherein said wall means comprises a fourth slot, and further comprising:

a plurality of said radially adjustable supports, said plurality of radially adjustable supports being spaced apart in a plane, and bearing on said first sheet;

a fourth gate associated with said fourth slot; and further control means coupled to said control means and to said fourth gate, for further control means coupled to said third and fourth gates, for maintaining one of said third and fourth gates in said inserted position, and for causing said third gate to temporarily assume said retracted position when one of said radially adjustable support progresses to be contiguous therewith, whereby said radially adjustable support may progress past said third gate to a second region between said third and fourth gates, and for causing said third gate to assume said inserted position after said radially adjustable support has progressed to said second region, and for causing said fourth gate to temporarily assume said retracted position when said one of said radially adjustable supports has progressed to be contiguous with said fourth gate, so that said one of said radially adjustable supports may leave said tubular chamber without opening said closed cavity.

10. An arrangement according to claim 9, said plurality of radially adjustable supports lying in a plane lies on a first side of said seam to bear against said first sheet, and further comprising a second plurality of said radially adjustable supports, said second plurality of said radially adjustable supports being located on a second side of said seam to bear against said second sheet.

* * * * *